March 27, 1956 — E. C. HUGE — 2,739,668
APPARATUS FOR SEPARATING VAPOR AND LIQUID AT HIGH PRESSURES
Filed Sept. 9, 1952 — 2 Sheets-Sheet 1
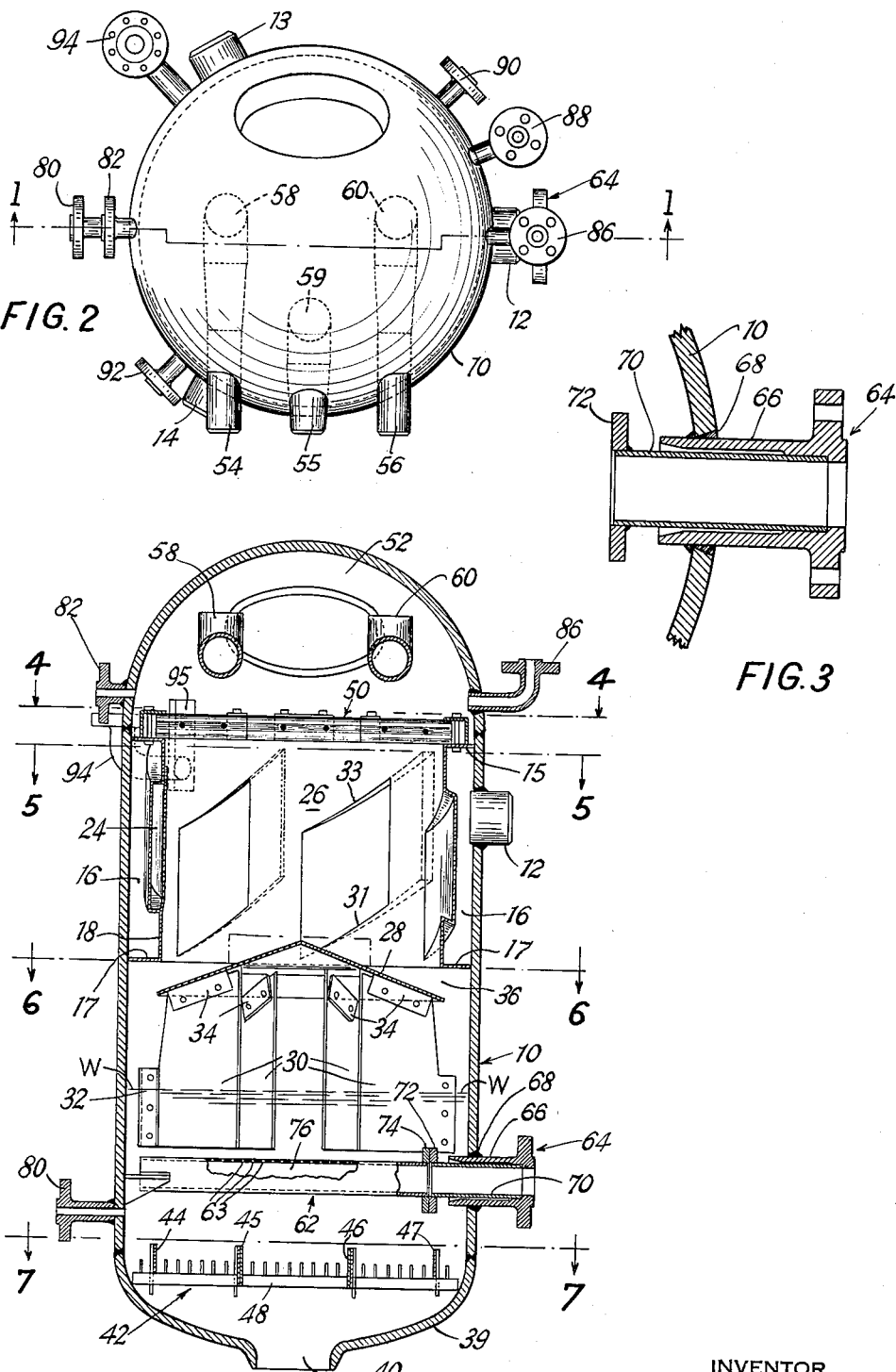
INVENTOR
Ernest C. Huge
BY
R. W. Holbrook ATTORNEY March 27, 1956     E. C. HUGE     2,739,668
APPARATUS FOR SEPARATING VAPOR AND LIQUID AT HIGH PRESSURES
Filed Sept. 9, 1952     2 Sheets-Sheet 2

INVENTOR
*Ernest C. Huge*
BY
*R. M. Holbrook* ATTORNEY

United States Patent Office 2,739,668
Patented Mar. 27, 1956

2,739,668

APPARATUS FOR SEPARATING VAPOR AND LIQUID AT HIGH PRESSURES

Ernest C. Huge, Akron, Ohio, assignor to The Babcock & Wilcox Company, New York, N. Y., a corporation of New Jersey Application September 9, 1952, Serial No. 308,671

4 Claims. (Cl. 183—85)

This invention relates in general to the construction and operation of gas and liquid separators, and more particularly, to apparatus for separating a mixture of a liquid and its vapor into its components which is characterized by its high capacity and minimum space requirements.

The invention further involves a pressure vessel constituting a vapor and liquid drum and constructed so as to provide for the centrifugal separation of vapor and liquid from vapor and liquid mixtures entering the drum.

The pertinent separator involves a fluid separating whirl chamber into which vapor and liquid mixtures flow at high velocity and in such a manner as to set up a whirling action of the fluid. This action results in centrifugal separation of liquid and vapor with the separated vapor collecting in the central portion of the whirl chamber and flowing upwardly therefrom. The whirling liquid is forced toward the outer portions of the whirl chamber and it exits therefrom at the bottom of the whirl chamber.

In a more specific sense, the invention involves a whirl chamber formed within a pressure vessel by means including a cylindrical wall which separates the whirl chamber from an inlet chamber for incoming fluid mixtures. This inlet chamber surrounds, and is concentric with, the whirl chamber. The cylindrical wall is formed with a plurality of fluid mixture inlet nozzles, so constructed as to cause the fluid mixture to have a whirling action within the whirl chamber and to direct the incoming fluid mixture streams in downwardly inclined paths. The inlet nozzles are inwardly curved to promote centrifugal separation and to promote maximum separating capacity in a separator of minimum weight and space requirements.

The inlet nozzles leading to the whirl chamber involve curved channels, having curvilinear inner and outer walls, the outer curved wall merging substantially tangentially into the circular wall of the whirl chamber. By reason of these curvilinear paths through the inlet nozzles the mixtures of vapor and liquid flowing therein will be subjected to some centrifugal effect before entering the main whirl chamber. Additionally, these curvilinear inlet nozzles have their outer ends at a minimum radius from the center of the shell. This means that the curvilinear inlet nozzles permit a shell construction of smaller diameter, while concurrently in their operation, they introduce a preliminary separating effect on the vapor and liquid flowing therethrough due to the curvilinear path.

The invention also includes a whirl chamber having a conical bottom promoting effective flow of the separated liquid from the whirl chamber. Beneath this conical bottom, the pressure vessel of the separator has an outlet for separated liquid and interposed relative to this outlet and the whirl chamber there is a vortex eliminator for promoting the optimum flow of high density separated liquid from the separator.

The invention involves a drum having a vertically elongated cylindrical portion integrated into a separator combination with an upper hemispherical enclosure to provide the maximum space enclosure per unit of drum wall, while the lower semi-elliptical section head with its central bottom liquid outlet minimizes the amount of water carried in the drum for a given water level and reduces the head room, thus minimizing the operating weight of the drum and its water content. With this combination there is no space within the drum shell that is not particularly effective either as steam accumulating space, steam and water separating space, or water space.

A preferred embodiment of the invention is shown in the accompanying drawings in which:

Fig. 1 is a central vertical section on the line 1—1 of Fig. 2;

Fig. 2 is a plan;

Fig. 3 is a detailed sectional view showing the particular construction of the feed water nozzle connection for the pressure vessel of the separator;

Figure 5:
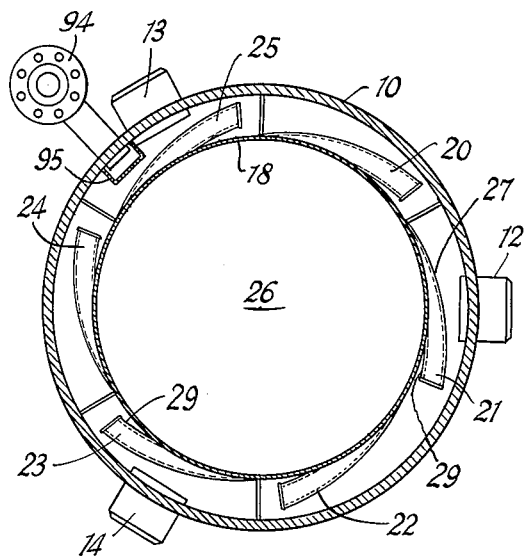
Fig. 5 is a horizontal section on the line 5—5 of Fig. 1, particularly showing the arrangement of the vapor and liquid mixture inlets of the inner wall.
Figure 4:
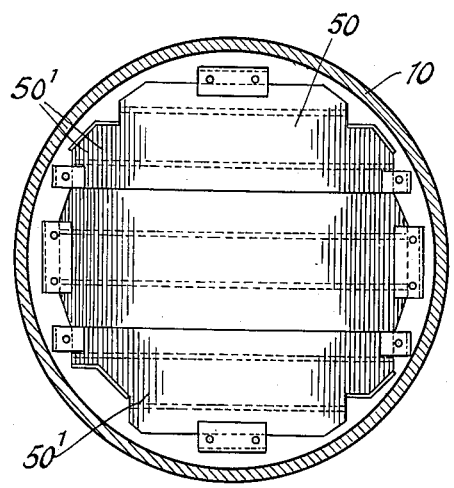
Fig. 4 is a horizontal section on the line 4—4 of Fig. 1.
Figure 6:
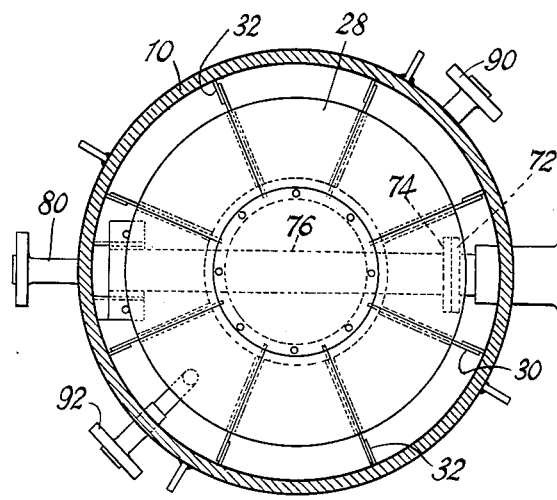
Fig. 6 is a horizontal section on the line 6—6 of Fig. 1.
Figure 7:
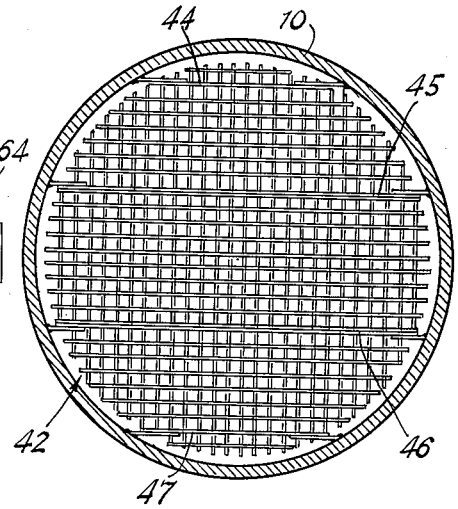
Fig. 7 is a horizontal section on the line 7—7 of Fig. 1.

The illustrative vapor generator component includes a fluid chamber herein shown as formed by an upright cylindrical pressure vessel or drum 10. This vessel is formed with a plurality of inlet connections 12—14 for the flow of fluid mixtures into an annular inlet chamber 16. This inlet chamber is formed by a top 15 and a bottom 17 joined by a cylindrical wall 18, the main part of which is spaced inwardly of the pressure vessel wall as shown. This wall is formed integrally with a plurality of inlet nozzles 20—25 directing the incoming fluid mixtures downwardly and non-radially within the whirl chamber 26. These nozzles have curved inner and outer walls 27 and 29 (Fig. 5), with inclined upper and lower walls (31 and 33, Fig. 1).

The whirl chamber has a conical bottom 28 supported by the upright radial plates 30 of a vortex eliminator. These plates are secured to the pressure vessel at 32. They are also secured to the whirl chamber bottom at 34.

The outer edge of the whirl chamber bottom 28 is disposed below the annular inlet chamber 16 so as to form an annular outlet 36 for separated liquid. Fluid flowing through this outlet has a high velocity whirling motion some of which is dissipated by the vortex eliminator plates 30 as the fluid flows downwardly towards the pressure vessel outlet 40 for the separated liquid. Further elimination or reduction of whirling action of the liquid flowing downwardly through the pressure vessel is effected by the auxiliary vortex eliminator 42. This is shown as consisting of subway grating with bars such as 44—47 arranged at 90° relative to crossbars 48.

The separated vapor flows upwardly from the whirl chamber 26 through a scrubber 50 which preferably consists of closely horizontally spaced and corrugated metallic elements 50' constructed and arranged somewhat as indicated in patent to Fletcher 2,007,966, July 16, 1935. An upper hemispherical head 52 forms a dome, minimizing space requirements and providing a vapor space above the scrubber 50, the separated vapor is discharged from the pressure vessel through a plurality of discharge conduits 54—56 which extend laterally into the dome 52 to their upwardly facing inlets 58—60, as shown in dotted lines in Fig. 2.

Between the auxiliary vortex eliminator 42 and the vortex eliminator plates 30, there is a tubular feed water inlet pipe 62 disposed below the normal operating liquid level W—W, and having openings 63 therealong. This pipe has the tubular drum connection 64 at one end. This connection is formed with an exterior member 66 of a thermal sleeve construction welded to the pressure vessel as indicated at 68 and having secured therein the tubular part 70. This part is flanged as indicated at 72 for securement to a similar flange 74 on the end of the feed water inlet pipe 76.

The lower head 39 is substantially semi-elliptical, minimizing the amount of separated liquid carried by the separator for a given liquid level, reducing head room, and minimizing the operating weight and water content of the separator.

Adjacent the feed water inlet connection there is a lower water column connection 80 (Fig. 1) welded to the pressure vessel. A similar connection 82 communicates with the dome 52 for the securement of the upper portion of a water column construction. Other and similar drum connections include the pilot valve connections 86 and 88, the feed water regulator connection 90, and blow-off connection 92, and the safety valve connection 94. The inlet of the latter is in communication with the vapor space of the separator. This is provided by the upwardly opening compartment 95.

One of the pilot valve connections is adapted to have a pilot valve secured thereto for operating a superheater safety valve, and a main drum valve secured to connection 94. The superheater valve is set to blow first, at a pressure lower than that of the drum valve.

While in accordance with the provisions of the statutes, I have illustrated and described herein the best form and mode of operation of the invention now known to me those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. In a centrifugal separator, an upright cylindrical pressure vessel of circular cross-section having walls of heavy gauge metal and, means forming an annular unitary inlet chamber construction of light gauge metal at the upper part of the pressure vessel, said means comprising a hollow cylindrical wall and upper and lower annular flanges rigid with and extending radially outwardly of the wall, said wall and chamber being of substantial axial extent and concentric with the pressure vessel and forming a centrally arranged circular whirl chamber, the inlet chamber construction flange fitting closely within the pressure vessel to form an annular mixture inlet chamber normally receiving vapor and liquid mixtures under high pressure, the inlet chamber construction including a plurality of circumferentially arranged inlet nozzles of light gauge metal rigid with the cylindrical wall and having their inlets open to and disposed within said annular mixture inlet chamber and spaced outwardly radially of said circular wall and having their outlets open to the whirl chamber, said nozzles being curved in plan with their concavities opening inwardly and being so constructed that the flow passage through each nozzle is narrow radially of the pressure vessel and wide axially of the pressure vessel, the nozzles being similarly so constructed and arranged as to set up a whirling motion of the fluid within the whirl chamber.

2. In a vapor and liquid separator for a vapor generator comprising, in combination, a pressure vessel in the form of an upright cylindrical vapor and liquid drum having upper and lower heads with the upper head providing a vapor dome, a liquid and vapor mixture inlet connection through the upper portion of the wall of the pressure vessel, a separated liquid discharge conduit connection extending from the lower head, a vapor discharge conduit having an inlet end within the dome of the upper head and extending laterally of the pressure vessel, a unitary inlet chamber construction of light gauge metal including an inner cylindrical wall positioned in the upper portion of the cylindrical drum and having its upper and lower ends fitted closely to the upright wall of the drum to provide therewith an annular vapor and liquid mixture inlet chamber in communication with said inlet connection, said unitary inlet chamber construction including a plurality of circumferentially distributed and downwardly inclined and inwardly curved wall inlet nozzles disposed within and opening to said annular chamber and having their outlet ends terminating at the inner cylindrical wall of a central whirl chamber, a bottom member disposed transversely of said central whirl chamber and spaced from the lower edge of the wall thereof to provide an annular liquid discharge connection to the space at the lower end of the drum, and means forming a central vapor outlet opening from the upper end of the central whirl chamber to the upper vapor space within said dome, said bottom member being substantially spaced downwardly of said annular inlet chamber.

3. In a vapor and liquid separator comprising, in combination, a pressure vessel constructed of heavy gauge metal in the form of an upright cylindrical vapor and liquid drum having outwardly dished upper and lower heads with the upper head providing a vapor dome, a liquid and vapor mixture inlet connection through the upper portion of the pressure vessel, a separated liquid discharge conduit connection extending from the lower head, a vapor discharge conduit having an upwardly opening inlet end within the dome of the upper head and extending laterally of the drum, a unitary inlet chamber construction of light gauge metal including an inner cylindrical wall spaced inwardly of the upper portion of the cylindrical drum and having outwardly extending annular flanges at its upper and lower ends to combine with a part of the drum wall to form an annular inlet chamber in communication with said inlet connection, said unitary inlet chamber construction including a plurality of circumferentially distributed and downwardly inclined and inwardly curved wall inlet nozzles opening to and disposed within said annular inlet chamber and having their outlet ends terminating in openings in the inner cylindrical wall the inner surface of said inner wall defining a central whirl chamber, a bottom member disposed transversely of said central whirl chamber and spaced from the lower edge of the wall thereof to provide an annular liquid discharge to the space at the lower end of the drum, and means forming a central vapor outlet opening from the upper end of the central whirl chamber to the upper vapor space within said dome.

4. In a vapor and liquid separator, an upright cylindrical pressure vessel of heavy gauge metal having an inlet for fluid mixtures and having spaced outlets for separated vapor and separated liquid, a unitary inlet chamber construction including an inner cylindrical wall of light gauge metal provided exteriorly with circumferentially distributed downwardly inclined fluid mixture inlet nozzles, said inner wall having its main part spaced inwardly of the pressure vessel and arranged to form therewith an annular inlet chamber communicating with the pressure vessel inlet for fluid mixtures, said inner wall having circular flanges unitary therewith and forming the top and bottom of the annular inlet chamber, the inner surface of the inner wall defining a centrally arranged whirl chamber, the upper part of the whirl chamber having communication with the pressure vessel outlet for separated vapor, and a unitary whirl chamber bottom and vortex eliminator construction secured within the pressure vessel beneath the whirl chamber and arranged to provide a substantially annular whirl chamber outlet for separated liquid at the bottom and outer edge of the whirl chamber, the vortex eliminator including upright plates disposed in the path of fluid flow from the whirl chamber to said pressure vessel outlet for separated liquid.

(References on following page)

References Cited in the file of this patent

UNITED STATES PATENTS

| | | |
|---|---|---|
| 630,023 | Baker | Aug. 1, 1899 |
| 1,627,713 | Seymour | May 10, 1927 |
| 2,010,435 | Matheson | Aug. 6, 1935 |
| 2,106,589 | Bigger et al. | Jan. 25, 1938 |
| 2,489,903 | Kraft et al. | Nov. 29, 1949 |
| 2,654,351 | Ammon | Oct. 6, 1953 |

FOREIGN PATENTS

| | | |
|---|---|---|
| 319,324 | France | July 19, 1902 |